Figure 2:
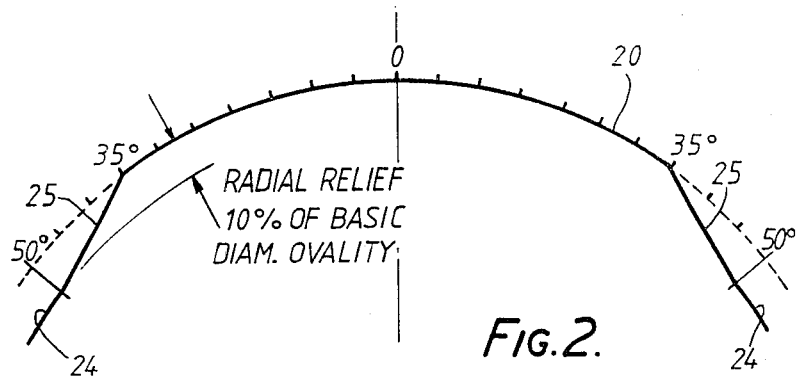

United States Patent [19]

Felici et al.

[11] Patent Number: 4,760,771
[45] Date of Patent: Aug. 2, 1988

[54] PISTONS WITH OIL RETAINING CAVITIES

[75] Inventors: Alberto Felici, Moncalieri, Italy; Michael L. P. Rhodes, Rugby, England

[73] Assignee: AE PLC, Warwickshire, England

[21] Appl. No.: 930,265

[22] PCT Filed: Feb. 27, 1986

[86] PCT No.: PCT/GB86/00103

§ 371 Date: Dec. 8, 1986

§ 102(e) Date: Dec. 8, 1986

[87] PCT Pub. No.: WO86/05249

PCT Pub. Date: Sep. 12, 1986

[30] Foreign Application Priority Data

Mar. 2, 1985 [GB] United Kingdom ............... 8505411

[51] Int. Cl.⁴ ............................................. F01B 31/10
[52] U.S. Cl. ........................................ 92/159; 92/208; 123/193 P
[58] Field of Search ............... 92/158, 159, 188, 189, 92/208, 209, 153, 157; 123/193 P

[56] References Cited

U.S. PATENT DOCUMENTS

| | | | |
|---|---|---|---|
| 1,016,561 | 2/1912 | Grabler | 92/158 X |
| 1,760,122 | 5/1930 | Drevitson | 92/158 |
| 2,195,552 | 4/1940 | Alexandrescu | 92/158 X |
| 2,407,440 | 9/1946 | Osborne | 92/159 |
| 4,535,682 | 8/1985 | Collyear et al. | 92/158 X |

FOREIGN PATENT DOCUMENTS

| | | | |
|---|---|---|---|
| 150130 | 2/1937 | Austria | 92/208 |
| 203852 | 11/1984 | Japan | 123/193 P |
| 156956 | 8/1985 | Japan | 123/193 P |
| 643088 | 9/1950 | United Kingdom . | |
| 752329 | 7/1956 | United Kingdom . | |
| 1319958 | 6/1973 | United Kingdom . | |

OTHER PUBLICATIONS

*Enkele Bijzonderheden,* E. H. Hulst, 9/50.

*Primary Examiner*—Robert E. Garrett
*Assistant Examiner*—Mark A. Williamson
*Attorney, Agent, or Firm*—Leydig, Voit & Mayer

[57] ABSTRACT

A piston has skirt portions (13) which are provided with parallel rows (14) of cavities (15) whose maximum depth below the surface of the skirt portion is 0.010 mm. Parts (20,23) of the skirt portion are left between the cavities for providing a reduced area, in comparison with the full skirt portion, for the transmission to an associated cylinder or liner of lateral loads; this reduced area reducing the frictional losses. The cavities (15) hold lubricating oil and provide a cushion of oil which supplies oil to the reduced bearing areas and which tends to resist lateral movement of the piston at top and bottom dead center, so reducing or eliminating "piston slap".

14 Claims, 3 Drawing Sheets

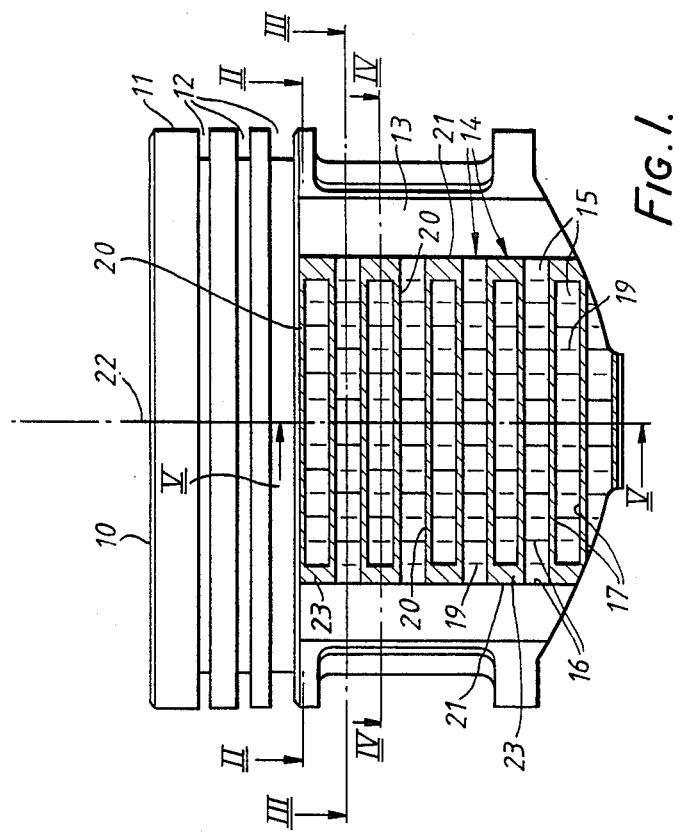
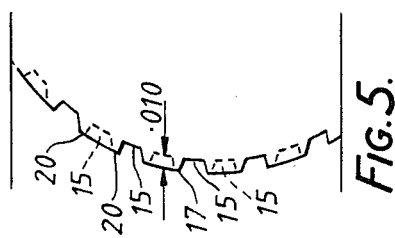

PISTONS WITH OIL RETAINING CAVITIES

The invention relates to pistons for internal combustion engines or compressors.

The movement of a piston within an associated cylinder or liner includes complex lateral movement in addition to the basic reciprocatory movement. These lateral movements arise as a result of the clearance between the piston and the associated cylinder or liner and the varying lateral loads on the piston as a result of the varying angle of an associated connecting rod and the varying loads on the crown of the piston during the compression/ignition cycle.

During reciprocatory movement, there is the need to maintain hydrodynamic lubrication between the piston and the associated cylinder or liner, so preventing the rapid increase in frictional forces which occurs when mixed or boundary lubrication is present. There is also the need to reduce or minimise the so-called "piston slap" which occurs particularly when the engine or compressor is under load and when the piston is at top or bottom dead centre. This is because such noise is generated by contact between these parts and implies the presence of undesirable wear. It has previously been thought necessary, in order to maintain hydrodynamic lubrication between the piston and the associated cylinder or liner, to have a substantially continuous skirt surface on the piston over which a lubricating film is generated. It has also been thought possible to mitigate "piston slap" by the creation of a full belt of oil between the piston skirt and the associated cylinder or liner to provide viscous damping of the transverse motion of the piston at top and bottom dead centre.

However, it has recently been discovered, as discussed in U.K. Patent Specification No. 2,104,188, that the load transmitting area of the skirt of a piston can be reduced substantially with mixed or boundary lubrication occurring by measures to ensure the provision of efficient hydrodynamic lubrication over specific bearing areas of the skirt. However, this reduction of hydrodynamically lubricated skirt area tends, in theory at least, to increase the noise generated on "piston slap", as a result of the reduced quantity of oil between the piston and the associated cylinder or liner.

According to the invention, there is provided a piston for an internal combustion engine or compressor, of the kind comprising a crown, a gudgeon pin bore and two skirt portions on opposite sides of the gudgeon pin bore, characterised in that each skirt portion has formed therein a plurality of cavities such that at least one part of said skirt portion remains for the transmission of lateral loads from the piston to an associated cylinder or liner, the cavities being arranged in rows, each row extending around the associated skirt portion, the cavities holding lubricant for passage over said at least one remaining part of the skirt portion to lubricate said skirt part hydrodynamically during reciprocation of the piston, and for damping lateral movement of the piston.

Figure 3:
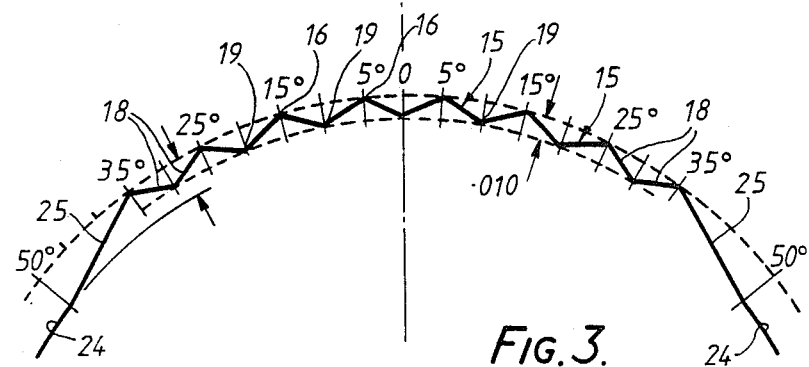
Figure 4:
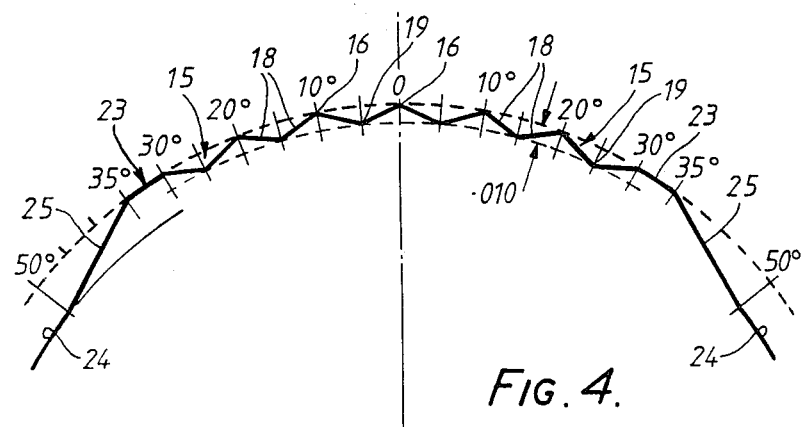
Figure 6:
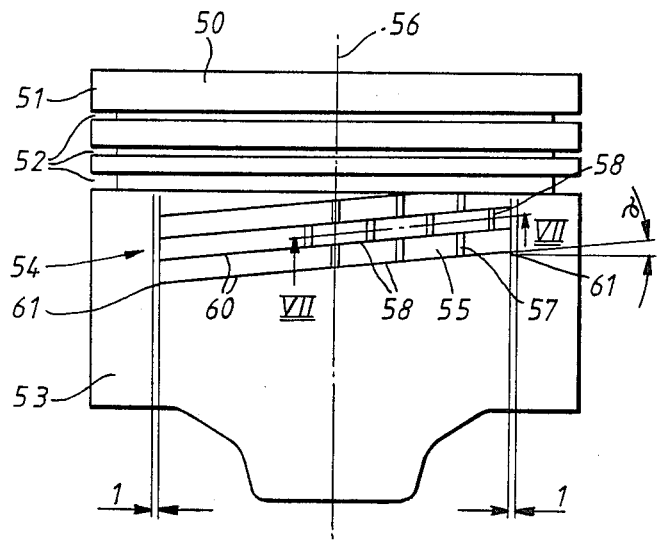
Figure 7:
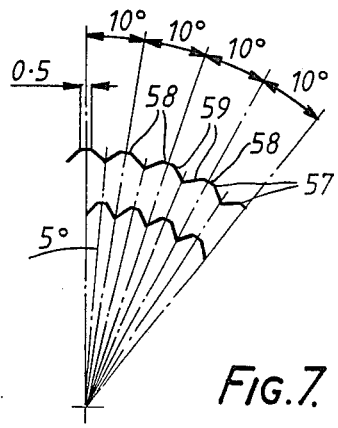

The following is a more detailed description of two embodiments of the invention, by way of example, reference being made to the accompanying drawings in which:

FIG. 1 is a side elevation of a first form of piston for an internal combustion engine showing a plurality of rows of cavities formed in a skirt portion of the piston, FIG. 2 is a section of the skirt portion of the piston of FIG. 1 on the line II—II of FIG. 1, FIG. 3 is a section of the skirt portion of the piston of FIG. 1 on the line III—III of FIG. 1, FIG. 4 is a section of the skirt portion of the piston of FIG. 1 on the line IV—IV of FIG. 1, FIG. 5 is a section of the skirt portion of the piston of FIG. 1 on the line V—V of FIG. 1, FIG. 6 is a side elevation of a second form of piston for an internal combustion engine and formed with rows of cavities on a skirt portion of the piston, and FIG. 7 is a part-section of a skirt portion of the piston of FIG. 6 on the line VII—VII of FIG. 6.

Referring to FIG. 1, the first piston is formed from aluminum or aluminum alloy by casting, for example squeeze casting, or by forging or any other suitable process and is then rough-turned and finish machined. The piston includes a crown 10, a ring band 11, formed with three piston ring grooves 12, and two gudgeon pin bosses (not shown) defining a gudgeon pin bore. There are two skirt portions, one of which is shown at 13, on opposite sides of the gudgeon pin bore.

Each skirt portion 13 is barrelled, (as shown in very exaggerated fashion in FIG. 5) and is formed with a plurality of rows 14 of cavities 15, each row 14 extending circumferentially around the associated skirt portion 13.

Each cavity 15 is generally rectangular in shape with two shorter sides 16 and two longer sides 17, the longer sides 17 extending generally parallel to the length of the associated row 14 (i.e. extend circumferentially). The shorter sides 16 lie in respective planes including the piston axis (i.e. extend axially) (see FIGS. 3 and 4). The base of each cavity is formed by two planar portions 18 (see FIGS. 3 and 4) inclined downwardly from respective shorter edges 16 and meeting at a base 19 of the associated cavity 15. As seen in FIGS. 3 and 4, the depth of each base 19 is 0.010 mm, although this depth may be between 0.005 mm and 0.015 mm. The circumferential extent of each cavity 15 is 10° (see FIGS. 3 and 4).

In each row 14, adjacent cavities share a common shorter side 16 (see FIGS. 1, 3 and 4). However, each row 14 of cavities 15 is separated from the or each next adjacent row 14 of cavities by a land 20 extending parallel to the lengths of the associated rows 14 (see FIGS. 1 and 2).

The cavities of adjacent rows 14 are circumferentially staggered relative to one another. Thus the ends of alternate rows 14 of cavities terminate on a respective common edge 21 lying in a plane including the piston axis 22. However, the rows 14 of cavities intermediate said alternate rows, terminate before said edges 21 (due to the staggering), there being a further land 23 between the terminations of the intermediate rows 14 and the edges 21. The arcuate circumferential extent of each further land 23 is 5° (see FIG. 4).

The edges 21 at which the sets of alternate rows 14 terminate are circumferentially spaced by 35° from the intersection with the skirt portion 13 of a plane including the piston axis 22 and normal to the gudgeon pin bore axis (see FIG. 3).

The skirt portion 13 beyond these edges is relieved radially by 10% of the basic piston diameter or ovality with these relieved portions 24 (see FIG. 2) being connected to the edges by ramps 25 whose circumferential extent is 15° (see FIGS. 2, 3 and 4).

This configuration of rows 14 of cavities may be produced by a machine tool of the kind described in U.K. Patent Specifications Nos. 2,079,661 and 2,143,968.

To produce the lands, referring to FIG. 2 and assuming rotation from right to left in FIG. 2, the tool (not shown), during each revolution of the piston performs a radially outward movement from the relieved portion 24 to form a ramp 25, and then remains at a required radial distance around the angular extent of the land 20, before being moved inwardly to form the ramp 25 at the opposite edge of the land 20. To form each row of cavities which terminates at the lateral edge 21 (as shown in FIG. 3, assuming rotation as in FIG. 2), the tool is once again moved radially outwardly at the end of the relieved portion 24 to form the ramp 25 extending up to said edges 21, and is then moved inwardly and outwardly to form the cavities 14 before being moved radially inwardly to form the ramp 25 extending from the other lateral edge 21 down to the relieved portion 24 of the skirt. The rows 14 of cavities which terminate inwardly of said lateral edges, as seen in FIG. 4 and assuming rotation as in FIGS. 2 and 3, are formed similarly to the rows of FIG. 3, as described above, except that both at the end of the first ramp 25 and also before the beginning of the second ramp, the tool is held at a constant radial position for 5° to form the further lands 23.

Due to the rapid response time of such a machine tool and the accuracy of machining achievable with such a machine tool, such piston profiles can be turned at very rapid rates, for example with the piston rotating at speeds of up to 3,000 rpm. The configuration of the rows 14 of cavities makes optimum use of the high speed machining capabilities of such a machine tool.

In use, the piston of FIG. 1 reciprocates within an associated cylinder or liner (not shown). During such reciprocation, oil from the wall of the associated cylinder or liner passes over the skirt portions 13 and collects in the cavities 15. The lateral loads on the piston are transmitted to the associated cylinder or liner only through the lands 20, 23. The surfaces of these lands 20, 23 are efficiently hydrodynamically lubricated by oil from the cavities forming an oil film over the land areas. Thus there is a reduction in frictional losses, as compared to a piston with a full skirt, due to the reduced area of these lands 20, 23 in comparison with the area of a full skirt.

At top and bottom dead center, where there is a tendency to "piston slap", the oil in the cavities 15 provides a cushion of oil between the piston and the associated cylinder or liner which tends to reduce or prevent "piston slap". The staggered relationship of the rows of cavities means that there is no ready axial path for dispersal of oil from the cavities 15, which helps to maintain the oil cushion for the greatest possible time.

The cavities 15 need be only of limited circumferential extent because the lateral loads on the piston are taken only by the central regions of the skirt portions 13.

Thus the piston described above with reference to FIGS. 1 to 5 of the drawings, provides a reduced lateral load transmitted area, which thus, during reciprocation, reduces the frictional forces between the piston and the associated cylinder or liner but which nevertheless has hydrodynamic lubrication maintained over the load transmitting surfaces (the lands). Further, the cavities form oil cushions which reduce or eliminate "piston slap".

Referring next to FIG. 6, the second piston is formed from aluminum or aluminum alloy by casting, for example by squeeze casting, or by forging or any suitable process, and is then rough turned and finish machined. The piston includes a crown 50, a ring band 51, formed with three piston ring grooves 52, and two gudgeon pin bosses (not shown) defining a gudgeon pin bore. There are two skirt portions (one of which is shown at 53), on opposite sides of the gudgeon pin bore.

Each skirt portion 53 is barrelled and is formed with a plurality of rows 54 of cavities 55, each row 54 extending in a direction lying in a respective plane inclined relatively to a plane including the piston axis 56, by an angle $\alpha$ (see FIG. 7), the planes of all the rows 54 being mutually parallel.

Each cavity 55 is generally rectangular in shape with two shorter sides 57 and two longer sides 58, the longer sides 58 extending parallel to the length of the associated row 54. The shorter sides 57 lie in respective planes including the piston axis 56 (i.e. extend axially). Axially extending lands 58 are formed between the shorter sides 57 of adjacent cavities 55 in each row 54. The base of each cavity is formed by two planar portions 59 (see FIG. 7) inclined downwardly from respective shorter sides 57 and meeting at a base of the associated cavity. The maximum radial depth of each base (from the associated lands 58) is 0.010 mm, although this depth may be between 0.005 mm and 0.015 mm. The circumferential extent of each cavity 55 is 10° (see FIG. 7).

Each row 54 of cavities 55 is separated from the or each next adjacent row 54 of cavities 55 by an edge 60 extending parallel to the lengths of the associated rows 54 (see FIG. 7). Adjacent rows of cavities 55 are circumferentially staggered relative to one another. The ends of the rows 54 of cavities terminate at common edges 61 lying in respective planes including the piston axis 56. This means that, in some rows 54, there is only a part cavity adjacent these edges 61 (see FIG. 7).

The configuration of cavities of the embodiment of FIGS. 6 and 7 may be produced by any suitable machine tool.

In use, the piston of FIGS. 7 and 8 reciprocates within an associated cylinder or liner. During reciprocatory movement, lateral loads on the piston are transmitted to the associated cylinder or liner by the lands 58 between the cavities 55. Lubricating oil from the cavities 55 passes over these lands 58 to ensure that they are hydrodynamically lubricated, despite their reduced surface area in comparison with the full skirt. This reduced surface area produces the frictional losses between the piston and the associated cylinder or liner, so increasing the performance of the associated engine. At top and bottom dead center, oil from the cavities forms a cushion which disperses only slowly due to the relative staggering of the rows and so tends to prevent or eliminate "piston slap".

It will be appreciated that, in the embodiment of FIG. 1, an edge may be provided between adjacent rows, and lands be provided between adjacent shorter edges of cavities in each row, as in the embodiment of FIG. 2. In addition, in the embodiment of FIG. 2, there may be an edge between adjacent sides of the cavities in each row and a circumferentially extending land provided between adjacent rows, as in the FIG. 1 embodiment.

What is claimed is:

1. A piston for lubricated reciprocation in an internal combustion engine or a compressor comprising:
   a crown, a gudgeon pin bore, two skirt portions on opposite sides of said gudgeon pin bore, a plurality of side-by-side rows of cavities which are formed in each said skirt portion and which are rectangular in shape with two shorter axially extending sides and two longer circumferentially extending sides interconnecting said shorter sides, adjacent cavities in a row having a common shorter side, a land of generally rectangular shape formed by said skirt portions and extending circumferentially between adjacent rows of cavities for transmitting lateral loads from said piston to an associated cylinder, whereby the cavities hold lubricating oil for passage over said lands and for damping lateral movement of the piston.

2. A piston according to claim 1, wherein the cavities of each row are circumferentially staggered relative to the cavities of the or each next adjacent row.

3. A piston according to claim 2, characterized in that the rows of cavities of each skirt portion are symmetrically disposed about a plane including the piston axis and normal to the gudgeon pin bore axis.

4. A piston according to claim 1, wherein the rows of cavities of each skirt portion are symmetrically disposed about a plane including the piston axis and normal to the gudgeon pin bore axis.

5. A piston according to claim 1, wherein the base of each cavity is formed by two flat portions extending downwardly from respective shorter sides of the associated cavity and meeting at a base parallel to and intermediate said shorter sides.

6. A piston according to claim, 1 wherein the radial depth of each said base in between 0.005 and 0.015 mm.

7. A piston according to claim 1, wherein a plurality of rows of cavities are provided with the cavities of the rows relatively circumferentially staggered, each end of alternate rows of cavities terminating on a common edge lying on a plane including the piston axis, each end of the rows of cavities intermediate said alternate rows terminating before said edge, there being a further land between said termination of said intermediate rows and said edge.

8. A piston according to claim 1, wherein the skirt portion beyond said edges is radially relieved.

9. A piston for lubricated reciprocation in an internal combustion engine or a compressor comprising:

a crown, a gudgeon pin bore, two skirt portions on opposite sides of said gudgeon pin bore, a plurality of side-by-side rows of cavities which are formed on each said skirt portion and which are rectangular in shape with two shorter axially extending sides and two longer sides interconnecting said shorter sides, adjacent rows of cavities having common longer sides, a land of generally rectangular shape extending axially between the shorter sides of adjacent cavities in each row for transmitting lateral loads from said piston to an associated cylinder, whereby the cavities hold lubricating oil for passage over said lands and for damping lateral movement of the piston.

10. A piston according to claim 9 wherein the cavities of each row are circumferentially staggered relative to the cavities of each next adjacent row.

11. A piston according to claim 9 wherein the rows of cavities of each skirt portion are symmetrically disposed about the plane including the piston axis and normal to the gudgeon pin bore axis.

12. A piston according to claim 9 wherein the base of each cavity is formed by two flat portions extending downwardly from respective shorter sides of the associated cavity meeting at a base parallel and intermediate said shorter sides.

13. A piston according to claim 9 wherein the radial depth of each said base is between 0.005 and 0.015 mm.

14. A piston according to claim 9 characterised in that said longer circumferentially extending sides interconnecting said shorter sides lie in respective planes inclined to planes normal to the piston axis, the planes of all the rows being mutually parallel.

* * * * *